Nov. 20, 1956  G. H. BRAMHALL ET AL  2,771,152
SUCTION CLEANER AND DISPOSABLE DUST BAG THEREFOR
Filed Feb. 18, 1954  2 Sheets-Sheet 1
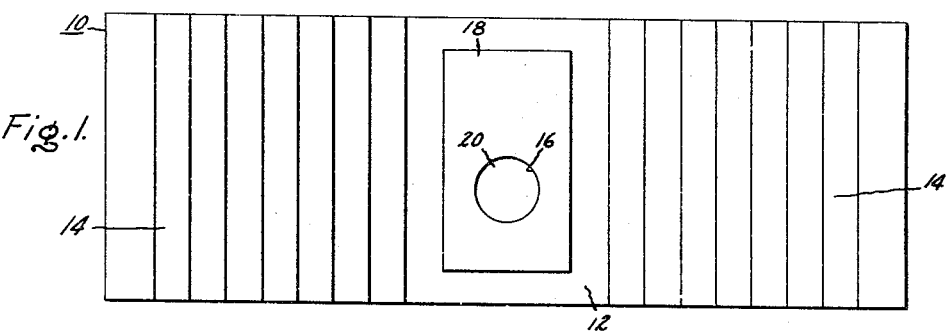
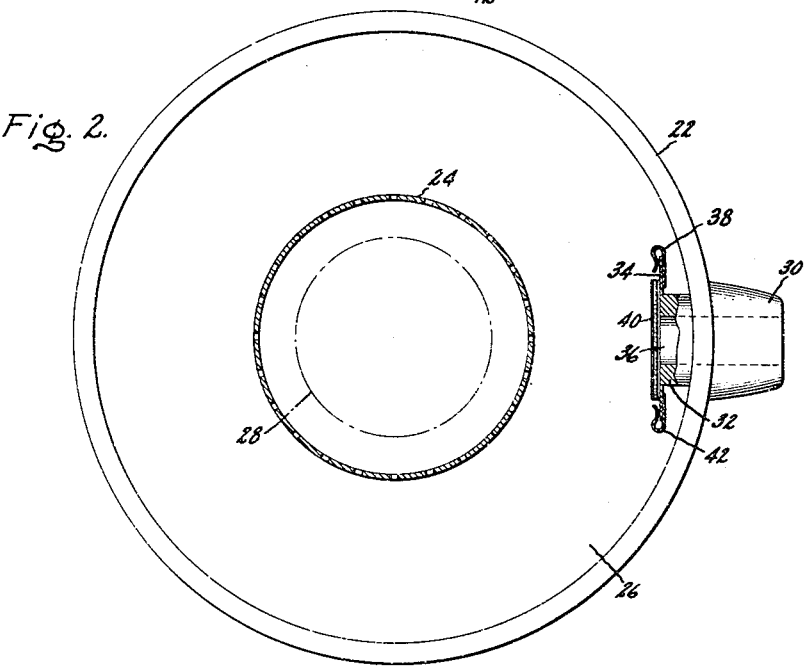
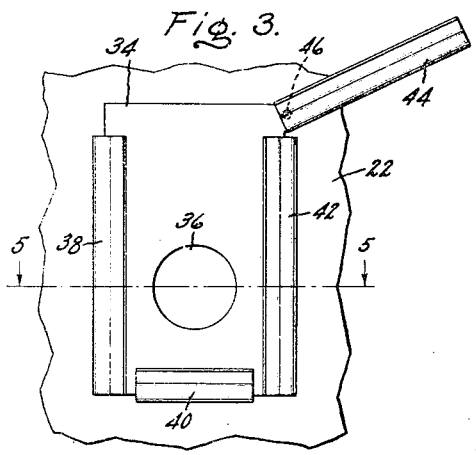
Inventors:
George H. Bramhall,
Warren N. Kemnitz,
by *[signature]*
Their Attorney.

Nov. 20, 1956 G. H. BRAMHALL ET AL 2,771,152
SUCTION CLEANER AND DISPOSABLE DUST BAG THEREFOR
Filed Feb. 18, 1954 2 Sheets-Sheet 2
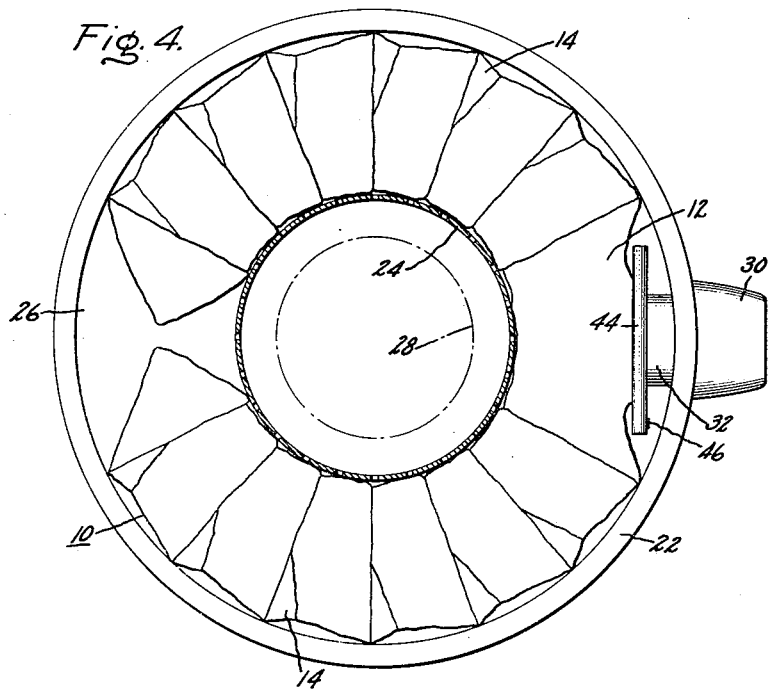
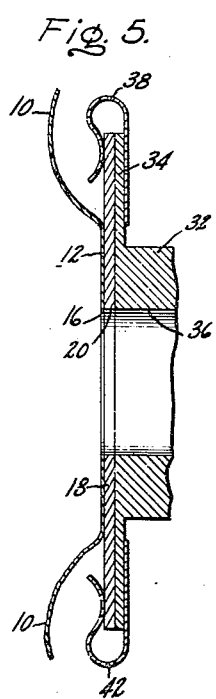
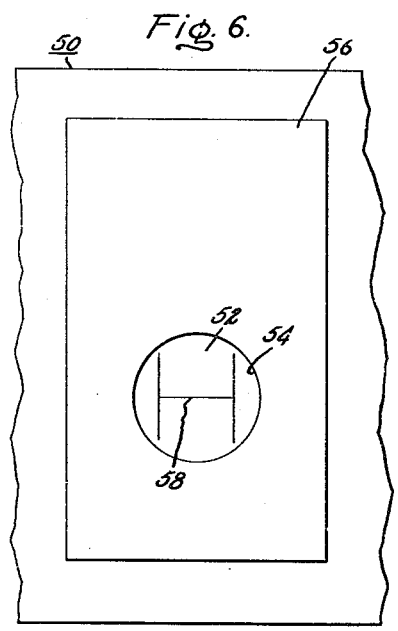
Inventors:
George H. Bramhall,
Warren N. Kemnitz,
by Frank L. Neuhauser
Their Attorney.

United States Patent Office

2,771,152
Patented Nov. 20, 1956

2,771,152
SUCTION CLEANER AND DISPOSABLE DUST BAG THEREFOR

George H. Bramhall, Chagrin Falls, and Warren N. Kemnitz, Willoughby, Ohio, assignors to General Electric Company, a corporation of New York Application February 18, 1954, Serial No. 411,056

5 Claims. (Cl. 183—37)

Our invention relates generally to suction cleaners, and more particularly to improved means for disposing of dust and dirt accumulated in a suction cleaner.

The wide and ever increasing uses of suction cleaners, particularly by domestic users, has intensified the problem of disposition of the dirt collected in the cleaner. The modern tendency is to provide disposable filters in the form of paper or cloth receptacles which remove and collect dust from the dust laden air stream. When full, these receptacles are manually removed and disposed of, as by placement in a trash container. Insertion and removal of such disposable bags can be an untidy operation. Because of the necessity of more frequent changing of the dust bag, due to increased usage of suction cleaners, it has become extremely desirable that insertion and removal manipulations be as simple and swift as possible, and further that the hands of the user, usually a housewife, not contact the dust or dirty portions of the filter during the changing operation.

It is an object of this invention to provide an improved filtering receptacle which is easily and conveniently inserted or removed from a suction cleaner, and which minimizes the possibility of having the hands of the user come into contact with the dust accumulated in the cleaner during removal of the receptacle.

The above and other objects are obtained by providing a disposable dust-collecting container made of filtering paper or the like, and having a coupling portion formed thereon, and further providing a complementary coupling portion on the interior of a suction cleaner that communicates with the inlet tube of the cleaner; the coupling portions being constructed to cooperate with each other to provide the desired quick, easy, clean coupling or uncoupling of the parts.

Other objects and details of that which we believe to be novel and our invention will be clear from the following description and claims taken with the accompanying drawings, in which are shown several examples of our improved suction cleaner and dust bag therefor.

Figure 1 is an elevation view of our improved, disposable, dust-collecting bag.

Figure 2 is an elevation view with portions shown in section of a suction cleaner having a part removed to more clearly show the internal construction.

Figure 3 is an elevation view of a portion of Figure 2 looking in the direction of the arrow in Figure 2.

Figure 4 is a view similar to Figure 2, wherein the disposable, dust-collecting bag is shown mounted in operative position.

Figure 5 is a sectional view taken on line 5—5 of Figure 3, showing the dust bag mounted in operative position.

Figure 6 is an elevation view of the mounting portion of a modified dust-collecting bag.

Our invention may be incorporated in any type of suction cleaner, such as the commonly known, relatively stationary, vertical tank or canister type, or the horizontal tank variety. Regardless of the specific type of suction cleaner into which our invention is incorporated, such cleaner may have conventional air-flow producing mechanism, flexible inlet hose and associated cleaning tools, and means for exhausting the air out of the cleaner. Our invention relates exclusively to the filtering structure and the portion of the cleaner to which it is connected.

Our improved dust bag 10 is shown by itself in Figure 1. It has been illustrated as being particularly adapted for use in a cleaner having an annular filtering chamber. It should be realized, however, that the coupling structure per se, which will be described subsequently, may be incorporated into dust bags that fit into spaces of different configuration. As viewed in Figure 1, dust bag 10 is substantially rectangular and essentially flat when at rest. It generally comprises a central portion 12 and pleated end portions 14. Central portion 12 has an inlet opening 16 formed centrally thereof in one of its sides, and is adapted to have a mounting plate 18, having an aperture 20, secured thereto with said aperture 20 being coincident with the inlet opening 16 (see Fig. 5). It should be realized that only one side of the dust bag is shown in Figure 1, and that there is a rear side which is similar to the side shown in Figure 1, with the exception that it does not have the mounting plate and the inlet opening. The dust bag 10 is made of a conventional filtering paper or cloth material, or composition, and is relatively yieldable and pliable, while the mounting plate 18 is made of a rigid material, such as cardboard or the like, which may be readily secured to the central portion 12 of the dust bag 10 as by gluing, or the like. By reference to Figure 5, it will be seen that the dust bag is secured to the mounting plate in the area adjacent to the opening 16, thereby leaving the outer, edge portions of the mounting plate free for a purpose to become apparent.

In Figure 2 there is shown a suction cleaner, having an end wall removed, into which the disposable dust bag illustrated in Figure 1 is particularly adapted to be inserted; it is generally cylindrical in configuration, having an outer, cylindrical wall 22 and a smaller, perforated, cylindrical wall 24 concentrically mounted therein, which together define an annular, filtering chamber 26 into which the dust bag is adapted to be positioned. The suction cleaner shown in Figure 2 has conventional air-producing mechanism, such as schematically shown motor and fan unit 28 which is located within wall 24 at one end thereof, and conventional, air exhausting structure that is located in the vicinity of the motor and fan unit. The air exhausting structure is not illustrated, since neither it nor the motor and fan unit form any part of our invention.

On the exterior of the cleaner, conventional, external inlet tube 30 is attached to the cylindrical wall 22, and is adapted to have a conventional, flexible hose coupled thereto. Inlet tube 30 has a portion 32 which extends through the wall 22 and projects into the filtering chamber 26. The inner end of portion 32 supports the part of our novel coupling arrangement which cooperates with the mounting plate 18 of our improved dust bag 10. This part of the coupling comprises flange-like, planar, mounting bracket 34 having an aperture 36 therein that is aligned with the opening in the inlet tube 30 thereby placing the interior of the cleaner into communication with the atmosphere. Mounting bracket 34 has associated therewith spring clips 38, 40 and 42, each of which is secured thereto at one of its sides. Clips 38, 40 and 42 are made of a flexible material, such as spring metal, and have portions secured to one side of the bracket 34 and other portions that are bent around and contact the other side of the bracket 34. From the drawings, particularly Figures 2 and 5, it will be seen that the bent clip portions contact the side of the bracket 34 which faces away from the inlet tube. Channelled strip 44 is pivoted on pin 46 located at one end of the side of bracket 34 which does not have a spring clip (see Figure 3).

Reference to Figures 2, 3, 4 and 5 will facilitate an understanding of the manner in which the mounting plate 18 of the disposable bag 10 is coupled to and uncoupled from the mounting bracket 34 of the inlet tube 30. Prior to and during the step of coupling and mounting plate 18 to the mounting bracket 34, the latch 44 is disposed in the general position shown in Figure 3. With the latch 44 in this position the mounting plate 18 is readily slid between the bracket 34 and its associated spring clips into mounted position. During this movement, the spring clips flex away from the bracket, and after the plate 18 is fully mounted, the spring clips urge it toward the bracket. After being fully mounted in the bracket, the mounting plate is locked in place by pivoting the latch 44 to its locking position, shown in Figure 4; in this position, the sides of the channel cover the open side of the bracket and mounting plate. It should be realized that the latch 44 can be dispensed with entirely, if it is so desired, and that it merely constitutes the refinement of positively locking the parts in coupled relationship and closing the side of the bracket 34 that does not have a spring clip.

From the foregoing, it should be realized that to mount a disposable bag, such as the one illustrated in Figure 1, into a suction cleaner, such as the one shown in Figure 2, it is simply necessary to slide the rigid, mounting plate 18 between the mounting bracket 34 and its associated spring clips, and that removal simply requires the reverse of this procedure.

In Figure 4 it will be seen that dust bag 10 after being mounted in the suction cleaner and inflated assumes a C-shape. In assuming this shape the pleated portions 14 are distorted and flexed so as to conform with the annular shape of the filtering chamber 26; in accomplishing this, the portions of the pleated portions 14 adjacent to the wall 24 are compressed, while the portions of the pleated portions 14 that are adjacent to the wall 22 expand.

After the dust bag 10 is mounted in operative position, as shown in Figure 4, the end wall (not shown) of the cleaner, which was removed prior to inserting the bag into the chamber 26, is replaced, and the cleaner is operated in the normal manner. Actuation of the motor and fan unit 28 produces a flow of dust-laden air through inlet hose (not shown), the inlet tube 30 and its inner portion 32, through the dust bag 10, where the dust and dirt are removed from the air stream and accumulated, and out of the air exhausting structure (not shown). When the dust bag is full, the end wall of the cleaner is removed, the bag is uncoupled from the mounting bracket 34, lifted out of the cleaner, and deposited in an appropriate trash receptacle. At this point, a new dust bag can be inserted into the cleaner and coupled to the mounting bracket; upon replacement of the end wall, the cleaner is ready for use again.

In Figure 6 is shown a portion of a modified dust bag 50 which is identical to dust bag 10 illustrated in Figure 1 in all respects but one. In order to avoid any possible loss of dirt when removing the dust bag from the cleaner and disposing of it, we have provided an air operated valve 52 in the aperture 54 of the mounting plate 56 of the dust bag. Air operated valve 52 comprises a diaphragm having a slit 58 cut therein. We have shown slit 58 as being in the shape of an H, but this is entirely a matter of choice, for it may take many different configurations; it is simply necessary to provide a slit which will provide movable portions that will open in response to a flow of air, and close when the air flow ceases. Air operated valve 52 may be conveniently and economically formed by simply cutting an H slit into the portion of bag 50 outlined by opening 54 of the mounting plate 56.

We have described in detail the structure and operation of our improved, disposable dust bag and the improved, suction cleaner, mounting structure therefor. As will be evident from the foregoing description, certain aspects of our invention are not limited to the particular details of construction of the examples illustrated, and we contemplate that various and other modifications will occur to those skilled in the art. It is, therefore, our intention that the appended claims will cover such modifications and applications as do not depart from the true spirit and scope of our invention.

What we claim as new and desire to secure by Letters Patent of the United States is:

1. A suction cleaner comprising a casing, an air flow producing means, an annular filtering chamber, a removable end wall on said casing which exposes the annular chamber when removed, a coupling member on said casing for removably securing a dust bag in said chamber, a dust bag which is elongated and substantially flat prior to being positioned in said chamber, said member comprising a trackway having an entrance portion facing said removable end wall for receiving a portion of said bag, said dust bag being adapted to be positioned in said chamber when said end wall is removed by inserting said portion of said bag into said trackway through it entrance portion, said bag conforming to the shape of said chamber when positioned therein.

2. For use in a suction cleaner having an annular filtering chamber, a dust bag comprising a receptacle and a rigid mounting plate, said receptacle being elongated and flat and comprising end portions and a central portion, said plate being secured to said central portion on one side of the receptacle, the end portions of said receptacle on each side of said plate extending in opposite directions and being pleated, whereby said bag assumes an elongated substantially flat disposition prior to positioning in said chamber, but may be positioned in said chamber with said plate coupled to said cleaner and the pleated portions of said receptacle flexed to conform to the shape of said chamber.

3. A device as defined in claim 1 wherein said trackway is formed by an apertured mounting bracket having a plurality of elongated spring clips mounted along its periphery.

4. In a vacuum cleaner, a dust bag, a coupling member for removably securing said bag in position in said cleaner, said coupling member comprising a U-shaped trackway for receiving and firmly but releasably gripping a portion of said bag, and latch means which is adapted to close the open side of the U for locking said bag in secured relationship.

5. In a vacuum cleaner, a dust bag, a coupling member for removably securing said bag in position in said cleaner, said coupling member comprising an apertured, planar, mounting bracket and a plurality of elongated spring clips which are mounted along the periphery of said bracket, said clips and the portions of said bracket which are adjacent to said clips cooperating to form a trackway for receiving and firmly but releasably gripping a portion of said bag.

References Cited in the file of this patent

UNITED STATES PATENTS

| | | |
|---|---|---|
| 2,070,674 | Muentener | Feb. 16, 1937 |
| 2,214,750 | Myers | Sept. 17, 1940 |
| 2,460,851 | Sheppard | Feb. 8, 1949 |
| 2,503,918 | Osborn et al. | Apr. 11, 1950 |
| 2,520,877 | Cavanagh | Aug. 29, 1950 |
| 2,528,332 | Bergquist | Oct. 31, 1950 |
| 2,533,057 | Senne | Dec. 5, 1950 |
| 2,571,125 | Ferraris | Oct. 16, 1951 |
| 2,621,757 | Anderson | Dec. 16, 1952 |
| 2,625,239 | Senne | Jan. 13, 1953 |
| 2,686,330 | Wales | Aug. 17, 1954 |

FOREIGN PATENTS

| | | |
|---|---|---|
| 794,294 | France | Dec. 12, 1935 |